US012136390B2

(12) United States Patent
Xie

(10) Patent No.: US 12,136,390 B2
(45) Date of Patent: Nov. 5, 2024

(54) DRIVE DEVICE AND ELECTRONIC APPARATUS

(71) Applicant: Chipone Technology (Beijing) Co., LTD., Beijing (CN)

(72) Inventor: Zongzhe Xie, Beijing (CN)

(73) Assignee: Chipone Technology (Beijing) Co., LTD., Beijing (CN)

( * ) Notice: Subject to any disclaimer, the term of this patent is extended or adjusted under 35 U.S.C. 154(b) by 80 days.

(21) Appl. No.: 17/845,945

(22) Filed: Jun. 21, 2022

(65) Prior Publication Data

US 2022/0328004 A1 Oct. 13, 2022

Related U.S. Application Data

(63) Continuation of application No. PCT/CN2020/132764, filed on Nov. 30, 2020.

(30) Foreign Application Priority Data

Oct. 12, 2020 (CN) ........................ 202011085597.6

(51) Int. Cl.
*G09G 3/3233* (2016.01)

(52) U.S. Cl.
CPC ... *G09G 3/3233* (2013.01); *G09G 2300/0819* (2013.01)

(58) Field of Classification Search
CPC ......... G09G 3/3233; G09G 2300/0819; G09G 2300/0842; G09G 2320/0626; G09G 3/32; G09G 3/36; G09G 3/3208; G09G 3/34
See application file for complete search history.

(56) References Cited

U.S. PATENT DOCUMENTS 10,504,429 B2 * 12/2019 Park ..................... G09G 3/3233
10,923,031 B2 * 2/2021 Yang .................... G09G 3/3233
11,386,820 B2 * 7/2022 Li .......................... G09G 3/006
(Continued)

FOREIGN PATENT DOCUMENTS

CN 101079233 A 11/2007
CN 101986378 A 3/2011
(Continued)

OTHER PUBLICATIONS

International Search Report issued in App. No. PCT/CN2020/132764, dated Jun. 25, 2021, 6 pages.
(Continued)

*Primary Examiner* — William Lu
(74) *Attorney, Agent, or Firm* — Butzel Long

(57) ABSTRACT

The present disclosure relates to a drive device and an electronic apparatus, the device including voltage generation module, a switch module, a capacitor module, a transistor module and a light emission module, the voltage generation module is configured to generate a first voltage and a second voltage; the switch module is configured to output the first voltage to a first end of the capacitor module in a first time period, and output the second voltage to a second end of the capacitor module in a second time period, so as to set a voltage of the first end of the capacitor module; the transistor module is configured to drive the light emission module to emit a light with the voltage of the first end of the capacitor module.

15 Claims, 5 Drawing Sheets

(56) References Cited

U.S. PATENT DOCUMENTS

2004/0174349 A1* 9/2004 Libsch ................. G09G 3/3233 257/E27.111
2005/0200572 A1* 9/2005 Weng ................... G09G 3/3241 345/76
2006/0221015 A1* 10/2006 Shirasaki ............... G09G 3/325 345/77
2006/0267884 A1* 11/2006 Takahashi ............ G09G 3/3233 345/76
2007/0273618 A1* 11/2007 Hsieh ................... G09G 3/3233 345/76
2008/0211746 A1* 9/2008 Caligiore ............. G09G 3/3233 345/76
2009/0115703 A1* 5/2009 Cok ..................... G09G 3/3233 345/76
2009/0207158 A1 8/2009 Park
2009/0231241 A1* 9/2009 Abe ..................... G09G 3/2011 345/76
2010/0033477 A1* 2/2010 Yamashita ........... G09G 3/3233 345/215
2010/0123697 A1* 5/2010 Goh ..................... G09G 3/3233 345/208
2010/0201673 A1 8/2010 Kim
2011/0025586 A1* 2/2011 Lee ...................... G09G 3/3225 345/76
2011/0074757 A1* 3/2011 Chung ................. G09G 3/3233 345/76
2011/0156611 A1* 6/2011 Tsai ...................... H05B 45/60 315/291
2011/0164018 A1* 7/2011 Kang .................. G09G 3/3233 345/76
2012/0105499 A1* 5/2012 Nakamura ........... G09G 3/3291 345/690
2015/0008894 A1* 1/2015 Cannankurichi ....... H02M 3/07 323/282
2015/0042692 A1* 2/2015 Kim ..................... G09G 3/3233 345/82
2017/0330505 A1* 11/2017 Han ..................... G09G 3/3266
2019/0012963 A1* 1/2019 Chen .................... G09G 3/3233
2019/0066598 A1* 2/2019 Kim ..................... G09G 3/3233
2020/0168150 A1* 5/2020 Lin .......................... G09G 3/32
2021/0126079 A1* 4/2021 Jo ......................... H01L 27/124

FOREIGN PATENT DOCUMENTS

CN 102222468 A 10/2011
CN 103021336 A 4/2013
CN 105976764 9/2016
CN 110675816 1/2020
CN 111328414 6/2020
CN 212411555 1/2021
JP 2019095790 A 6/2019
WO WO-2006053424 A1 * 5/2006 ........... G09G 3/3233

OTHER PUBLICATIONS

CN Office Action issued in CN 202011085597.6 dated Jun. 28, 2024.

* cited by examiner

DRIVE DEVICE AND ELECTRONIC APPARATUS

This present application is a continuation of and claims priority under 35 U.S.C. § 120 to PCT Application. No. PCT/CN2020/132764, filed on Nov. 30, 2020, which claims priority to Chinese Patent Application No. 202011085597.6 filed on Oct. 12, 2020, and entitled "DRIVE APPARATUS AND ELECTRONIC DEVICE". All the above referenced priority documents are incorporated herein by reference in their entireties.

TECHNICAL FIELD

The present disclosure relates to the technical field of display, and in particular to a drive device and an electronic apparatus.

BACKGROUND

Along with the constant development of science and technology, people are living higher life standards. Various types of electronic apparatus having a display function become increasingly popular. However, a display panel in existing electronic apparatus has a problem of inadequate brightness or flicker due to the inherent deficiency of the display panel. This not only affects user experience but also shortens the operation life of the display panel.

SUMMARY

In view of this, the present disclosure proposes a drive device. The device comprises a voltage generation module, a switch module, a capacitor module, a transistor module and a light emission module, wherein

- the voltage generation module is configured to generate a first voltage and a second voltage;
- the switch module is electrically connected with the voltage generation module and the capacitor module, and is configured to output the first voltage to a first end of the capacitor module in a first time period, and output the second voltage to a second end of the capacitor module in a second time period, so as to set a voltage of the first end of the capacitor module;
- the transistor module is electrically connected with a first end of the capacitor module and the light emission module, and is configured to drive the light emission module to emit a light with the voltage of the first end of the capacitor module.

In a possible implementation, the voltage generation module comprises:

- a first voltage generation unit configured to generate the first voltage based on luminance information and predetermined luminance-voltage relation, wherein the predetermined luminance-voltage relation includes an association relation between luminance information and voltage.

In a possible implementation, the voltage generation module further comprises:

- a second voltage generation unit configured to generate the second voltage based on a type of a transistor and a threshold voltage of a transistor in the transistor module.

In a possible implementation, the generation of the second voltage based on a type of a transistor and a threshold voltage of a transistor in the transistor module comprises:

- based on a transistor in the transistor module being a NMOS transistor, generating a second voltage with a value larger than a threshold voltage of the NMOS transistor and that is positive; or
- based on a transistor in the transistor module being a PMOS transistor, generating a second voltage with a value larger than a threshold voltage of the PMOS transistor and that is negative.

In a possible implementation, the switch module comprises a first switch, a second switch, a third switch, wherein

- a first end of the first switch is configured to receive the first voltage, a second end of the first switch is electrically connected to a first end of the capacitor module,
- the second switch has a first end connected to ground and a second end electrically connected to a second end of the capacitor module,
- the third switch has a first end configured to receive the second voltage and a second end electrically connected to a second end of the capacitor module.

In a possible implementation, the switch module is further configured to:

- in a first time period, close the first switch and the second switch, open the third switch, output the first voltage to a first end of the capacitor module;
- in a second time period, close the third switch, open the first switch and the second switch, output the second voltage to a second end of the capacitor module.

In a possible implementation, the capacitor module comprises:

- a first capacitor, a first end of the first capacitor being electrically connected, as a first end of the capacitor module, to the switch module and the transistor module, a second end of the first capacitor being electrically connected, as a second end of the capacitor module, to the switch module.

In a possible implementation, the drive device includes a plurality of transistor modules, a plurality of capacitor modules, and a plurality of light emission modules, the switch module may comprise a plurality of first switches, the voltage generation module is capable of generating a plurality of first voltages,

- wherein the voltage generation module is further configured to output a plurality of first voltages, each one of the first voltages corresponds to each one of the transistor modules;
- the switch module is further configured to set a voltage at a first end of each one of the capacitor modules to respective one of the first voltages and the second voltages so that the transistor module drives the light emission module.

In a possible implementation, the light emission module includes any one or more of LCD, LED, MiniLED, MicroLED or OLED.

According to an aspect of the present disclosure, provided includes an electronic apparatus, wherein the electronic apparatus comprises the afore-described drive device.

In a possible implementation, the electronic apparatus includes a display, a smart phone or a portable device.

By the above device, based on the generated first and second voltages, it is possible that the switch module outputs a first voltage and a second voltage in different time periods to the two ends of the capacitor module so as to control the first end of the capacitor module to reach a stable state, thereby compensating for the loss of the transistor module; also, it is possible that the transistor module is turned on by a voltage of the first end of the capacitor module in a stable state, so as to drive the light emission module to emit a light, thereby improving the luminance of the light emission module.

Additional features and aspects of the present disclosure will become apparent from the following description of exemplary examples with reference to the attached drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

DETAILED DESCRIPTION

Figure 1:
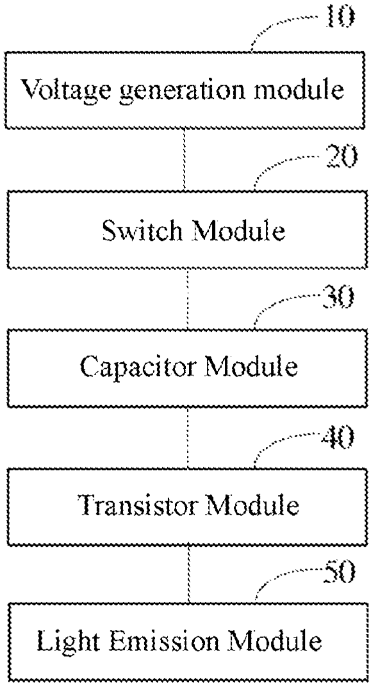
FIG. 1 is a block diagram of the drive device according to an embodiment of the present disclosure.

Various exemplary examples, features and aspects of the present disclosure will be described in detail with reference to the drawings. The same reference numerals in the drawings represent elements having the same or similar functions. Although various aspects of the examples are shown in the drawings, it is unnecessary to proportionally draw the drawings unless otherwise specified.

Herein the term "exemplary" means "used as an instance or example, or explanatory". An "exemplary" example given here is not necessarily construed as being superior to or better than other examples.

Numerous details are given in the following examples for the purpose of better explaining the present disclosure. It should be understood by a person skilled in the art that the present disclosure can still be realized even without some of those details. In some of the examples, methods, means, elements and circuits that are well known to a person skilled in the art are not described in detail so that the principle of the present disclosure become apparent.

Referring to FIG. 1, FIG. 1 is a block diagram of the drive device according to an embodiment of the present disclosure.

As shown in FIG. 1, the device comprises a voltage generation module 10, a switch module 20, a capacitor module 30, a transistor module 40 and a light emission module 50, wherein

- the voltage generation module 10 is configured to generate a first voltage and a second voltage;
- the switch module 20 is electrically connected with the voltage generation module 10 and the capacitor module 30, and is configured to output the first voltage to a first end of the capacitor module 30 in a first time period, and output the second voltage to a second end of the capacitor module 30 in a second time period, so as to set the voltage of the first end of the capacitor module 30;
- the transistor module 40 is electrically connected with a first end of the capacitor module 30 and the light emission module 50, and is configured to drive the light emission module 50 to emit light with the voltage of the first end of the capacitor module 30.

By the above device, based on the generated first and second voltages, it is possible that the switch module outputs a first voltage and a second voltage in different time periods to the two ends of the capacitor module so as to control the first end of the capacitor module to reach a stable state, thereby compensating for the loss of the transistor module; also, it is possible that the transistor module is turned on at a voltage of the first end of the capacitor module when stable, so as to drive the light emission module to emit a light, thereby improving the luminance of the light emission module, and the problem of flicker can be solved.

The device of the embodiment of the present disclosure may be various electronic apparatus having a display function, also known as user equipment (UE), mobile station (MS), mobile terminal (MT), etc., and may be an apparatus for providing voice and/or data connectivity to a user, such as a handheld apparatus, an on-board apparatus and the like with a wireless connection function. Some existing examples of terminals include: mobile phone, tablet computer, laptop computer, palmtop computer, mobile internet device (MID), wearable apparatus, virtual reality (VR) apparatus, augmented reality (AR) apparatus, wireless terminal in industrial control, wireless terminal in self driving, wireless terminal in remote medical surgery, wireless terminal in smart grid, wireless terminal in transportation safety, wireless terminal in smart city, wireless terminal in smart home, wireless terminal in Internet of Vehicles, etc.

In a possible implementation, the light emission module includes any one or more of Liquid Crystal Display (LCD), Light Emitting Diode (LED), Mini Light Emitting Diode (MiniLED), Micro Light Emitting Diode (MicroLED), Organic Light-Emitting Diode (OLED).

It should be noted that each module of the embodiment of the present disclosure may be implemented by hardware circuits. Exemplary description of possible implementation of each module in the drive device is as follow.

Figure 2:
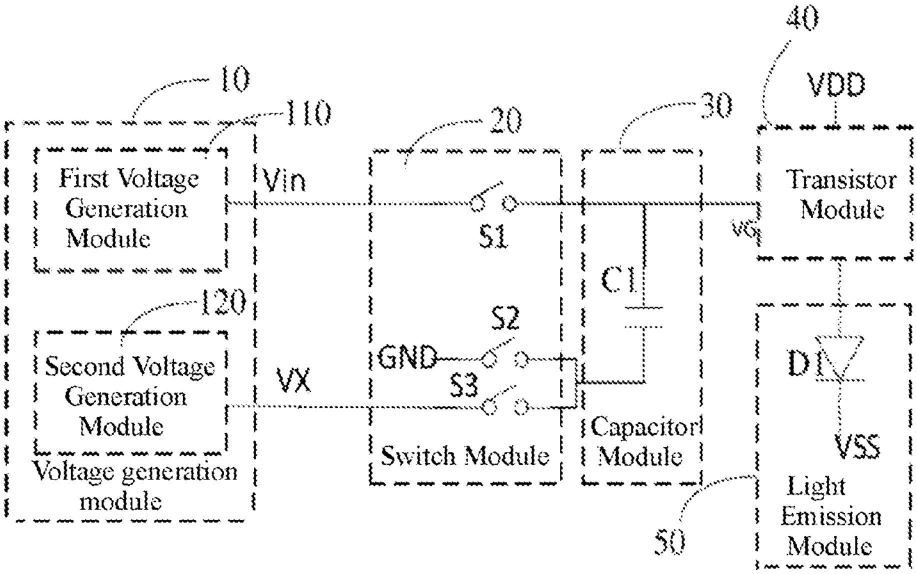
FIG. 2 is a schematic diagram of the drive device according to an embodiment of the present disclosure.

Referring to FIG. 2, FIG. 2 is a schematic diagram of the drive device according to an embodiment of the present disclosure.

In a possible implementation, as shown in FIG. 2, the voltage generation module 10 may comprise:

- a first voltage generation unit 110 configured to generate the first voltage Vin based on luminance information and predetermined luminance-voltage relation, wherein the predetermined luminance-voltage relation includes an association relation between luminance information and voltage.

In an example, the predetermined luminance relation may be set in advance. For example, the association relation between luminance and voltage may be set according to a type of display transistor included in the light emission module. For different light emission modules, different predetermined luminance-voltage relations may be set. Of course, the predetermined luminance relation may take the form of a table or may take other forms, which is not limited in the embodiment of the present disclosure.

The embodiment of the present disclosure does not limit the specific predetermined luminance relation and does not limit the type of the light emission module. A person skilled in the art may make the configuration per need.

The present disclosure does not limit the specific implementation of the first voltage generation unit. A person skilled in the art may choose implementation by a voltage generation apparatus (e.g., AC/DC conversion apparatus, DC/DC conversion apparatus) of the related art per need.

In an example, the voltage generation module may comprise a storage unit (not shown) configured to store the predetermined luminance relation or other data generated by each module of the drive device.

The storage unit may be implemented by a volatile or non-volatile storage apparatus of any type or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disc.

In a possible implementation, the transistor module 40 may comprise at least one transistor. The type of the transistor may be NMOS transistor, PMOS transistor, and the like.

The transistor module 40 may serve as a driver stage for the light emission module 50 to drive light emission in the light emission module.

In an example, since the transistor has a threshold voltage VTH, upon initiating the transistor module to drive the light emission module, the threshold voltage VTH will cause a loss in the first voltage generated by the first voltage generation unit 110. If the transistor module is still started by the first voltage to drive the light emission module, it will result in deficient luminance of the emitted light and abnormal display of the light emission module, which will affect the user experience.

In a possible implementation, as shown in FIG. 2, the voltage generation module 10 may further comprise:

- a second voltage generation unit 120 configured to generate the second voltage VX based on a type of a transistor and a threshold voltage of a transistor in the transistor module 40.

The second voltage generation unit according to the embodiment of the present disclosure generates the second voltage according to the type of the transistor and the threshold voltage of the transistor, thereby compensating for the loss of the transistor in the transistor module. As such, it is possible to improve the luminance of the light emission module.

It should be noted that the embodiment of the present disclosure does not limit the specific implementation of the second voltage generation unit. A person skilled in the art may choose the implementation by a voltage generation apparatus of the related art per need.

In a possible implementation, the generation of the second voltage based on a type of a transistor and a threshold voltage of a transistor in the transistor module may include:

- based on a transistor in the transistor module being a NMOS transistor, generating a second voltage with a value larger than a threshold voltage of the NMOS transistor and that is positive; or
- based on a transistor in the transistor module being a PMOS transistor, generating a second voltage with a value larger than a threshold voltage of the PMOS transistor and that is negative.

For different types of transistor, the embodiment of the present disclosure may generate a second voltage larger than the transistor threshold voltage and alter the positive or negative sign of the second voltage according to the type, so as to compensate for the loss of a transistor of different types in a targeted manner, which improves the adaptability.

In a possible implementation, as shown in FIG. 2, the switch module 20 may comprise a first switch S1, a second switch S2, a third switch S3, wherein:

- a first end of the first switch S1 is configured to receive the first voltage Vin, a second end of the first switch S1 is electrically connected to a first end of the capacitor module 30,
- the second switch S2 has a first end connected with ground, and a second end electrically connected to the second end of the capacitor module 30,
- the third switch S3 has a first end configured to receive the second voltage VX, and a second end electrically connected to a second end of the capacitor module 30.

By means of the respective switches of the switch module, it is possible that the embodiment of the present disclosure outputs the first voltage and the second voltage to the first end and the second end of the capacitor module in different time periods to regulate the voltage at the first end of the capacitor module, so as to compensate for the loss of the transistor module, thereby improving the driving capability when driving the light emission module.

Figure 3:
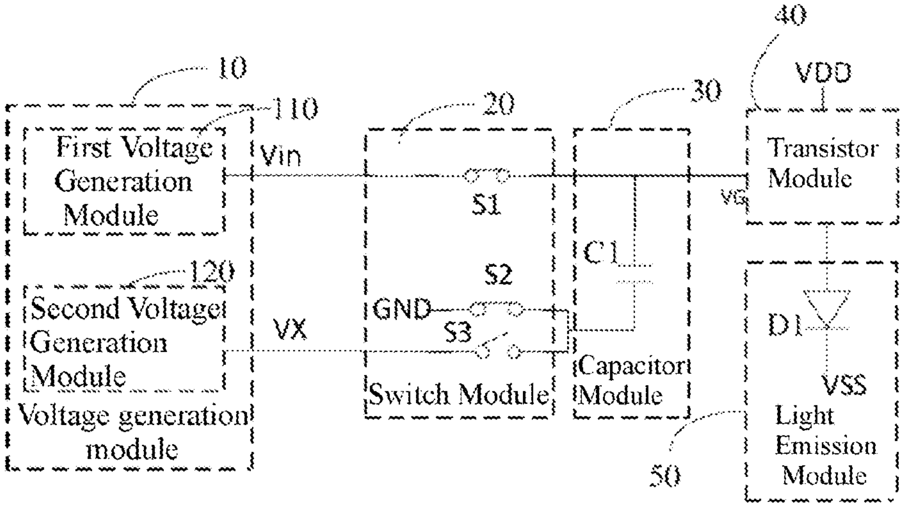
FIGS. 3 and 4 are schematic diagrams of the drive device according to an embodiment of the present disclosure.
Figure 4:
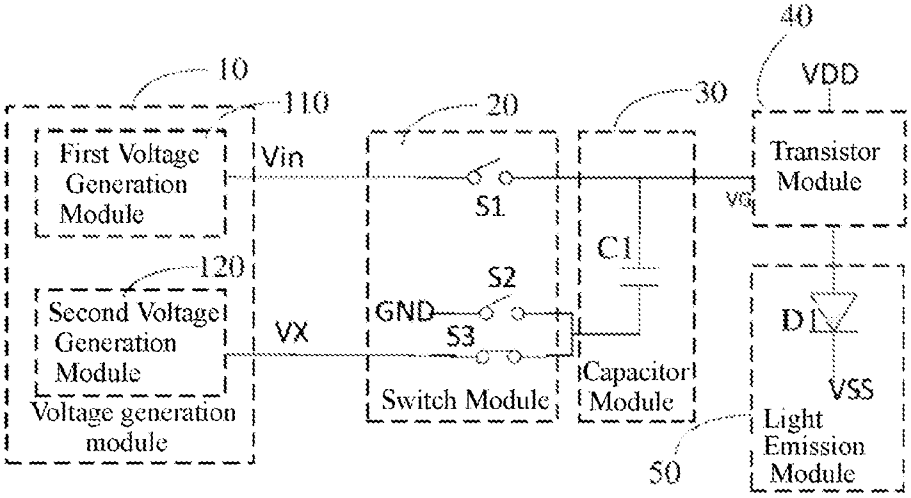

Referring to FIGS. 3 and 4, FIGS. 3 and 4 are schematic diagrams of the drive device according to an embodiment of the present disclosure.

In a possible implementation, as shown in FIG. 3, the switch module may be further configured to:

- in a first time period, close the first switch S1 and the second switch S2, open the third switch S3, output the first voltage Vin to a first end of the capacitor module 30;

In an example, in the first time period, by closing the first switch S1 and the second switch S2 and opening the third switch S3, the embodiment of the present disclosure is capable of stabilizing the voltage at the first end of the capacitor module at the first voltage.

In a possible embodiment, as shown in FIG. 4, in a second time period, the third switch S3 is closed while the first switch S1 and the second switch S2 are opened, so that the second voltage VX is output to the second end of the capacitor module 30.

In an example, in the second time period, by closing the third switch S3 and opening the first switch S1 and the second switch S2, the embodiment of the present disclosure is capable of lifting the voltage at the first end of the capacitor module to V1+V2. That is, the voltage at the input end of the transistor module VG=V1+V2. As such, the embodiment of the present disclosure is capable of compensating for the loss of the transistor module, so as to improve the luminance of the light emission module.

In an example, assuming that the transistor in the transistor module is a NMOS transistor, and assuming that the second voltage generated according to the threshold voltage of the NMOS transistor is 4 V and the first voltage generated according to the predetermined luminance relation is 5 V, the voltage at the first end of the capacitor module i.e. the input end of the transistor module VG=V1+V2=9 V.

In an example, assuming that the transistor in the transistor module is a PMOS transistor, and assuming that the second voltage generated according to the threshold voltage of the NMOS transistor is −4 V and the first voltage generated according to the predetermined luminance relation is 1V, the voltage at the first end of the capacitor module i.e. the input end of the transistor module VG=V1+V2=−3 V.

In a possible implementation, as shown in FIG. 2, the capacitor module 30 may comprise:

- a first capacitor C1, a first end of the first capacitor C1 being electrically connected, as a first end of the capacitor module 30, to the switch module 20 and the transistor module 40, a second end of the first capacitor C1 being electrically connected, as a second end of the capacitor module 30, to the switch module 20.

Certainly, in other embodiments, the capacitor module may further include other capacitor(s). Alternatively, the first capacitor C1 may take the form of a plurality of capacitors and other elements in parallel connection or in series connection, which is not limited in the embodiment of the present disclosure.

Figure 5:
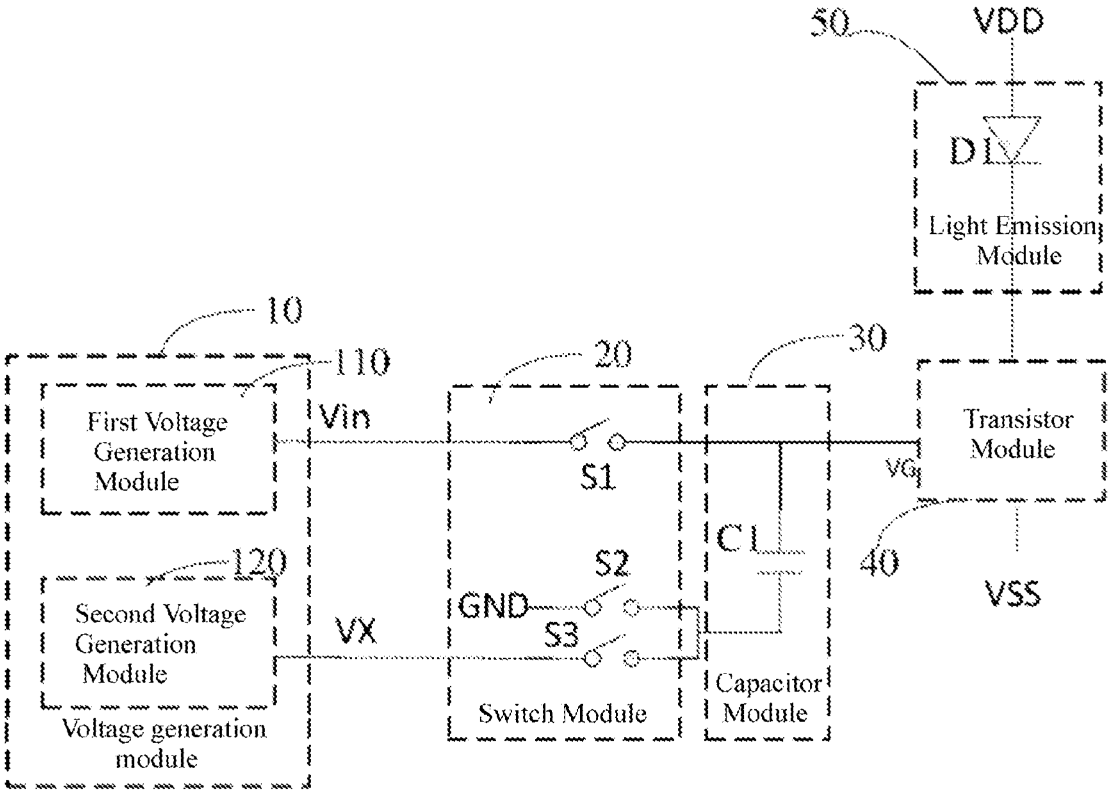
FIG. 5 is a schematic diagram of the drive device according to an embodiment of the present disclosure.

Referring to FIG. 5, FIG. 5 is a schematic diagram of the drive device according to an embodiment of the present disclosure.

In a possible embodiment, as shown in FIG. 5, the light emission module 50 may be arranged, in a manner different from that shown in FIG. 2, between the transistor module and the voltage VDD, so that a transistor of a different type can be used to drive the light emission module.

Figure 6:
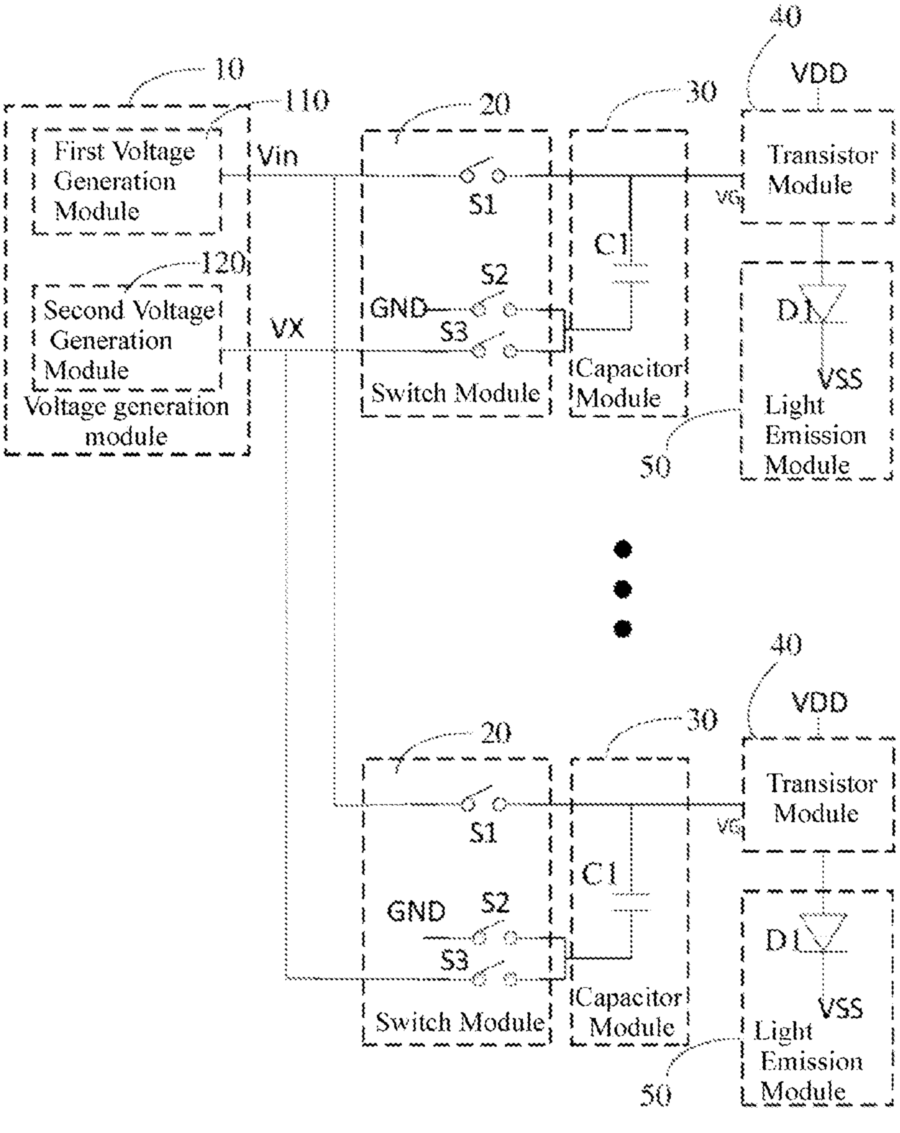
FIG. 6 is a schematic diagram of the drive device according to an embodiment of the present disclosure.

Referring to FIG. 6, FIG. 6 is a schematic diagram of the drive device according to an embodiment of the present disclosure.

In a possible embodiment, as shown in FIG. 6, the switch module, the capacitor module, the transistor module, the light emission module may serve as individual display components. A plurality of display components may be driven by the first voltage Vin and the second voltage VX generated by a voltage generation module, so as to eliminate the influence of the losses of the transistor module in each display component and improve the luminance of the light emitted by the light emission module.

Figure 7:
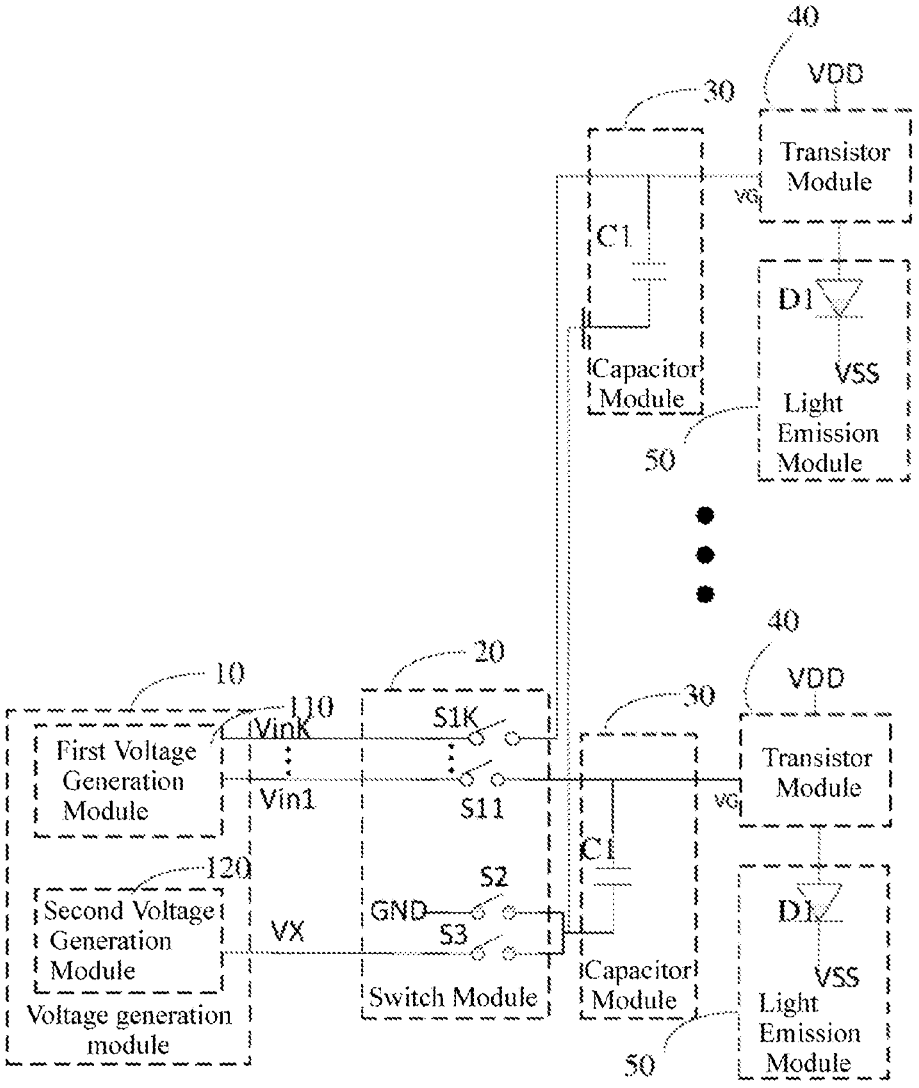
FIG. 7 is a schematic diagram of the drive device according to an embodiment of the present disclosure.

Referring to FIG. 7, FIG. 7 is a schematic diagram of the drive device according to an embodiment of the present disclosure.

In a possible embodiment, as shown in FIG. 7, there may be provided with a plurality of transistor modules, a plurality of capacitor modules, and a plurality of light emission modules. The switch module may include a plurality of first switches (S11 to S1K, K being an integer larger than 1). The first voltage generation unit may generate a plurality of first voltages (Vin1 to VinkK),

- wherein the voltage generation module is further configured to output a plurality of first voltages, each one of the first voltages corresponds to each one of the transistor modules;
- the switch module is further configured to set the voltage at the first end of each one of the capacitor module to the respective one of the first voltages and the second voltages so that the transistor module drives the light emission module.

The connection relation between the modules of the above devices including the voltage generation module, the switch module, and the capacitor module may refer to the foregoing description and will not be repeatedly described herein.

By the afore-described configuration, the embodiment of the present disclosure is capable of expanding the application of the drive device, and provides adaptive compensation for a plurality of transistor on a display panel, so that the display luminance of the light emission module increases, thereby improving the display effect of the entire display panel.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A drive device, comprising a voltage generation module, a switch module, a capacitor module, a transistor module, and a light emission module, wherein;

- the voltage generation module is configured to generate a first voltage and a second voltage;
- the switch module comprises:
  - a first switch comprising a first end configured to receive the first voltage and a second end electrically connected to a first end of the capacitor module;
  - a second switch comprising a first end connected to ground and a second end electrically connected to a second end of the capacitor module; and
  - a third switch comprising a first end configured to receive the second voltage and a second end electrically connected to a second end of the capacitor module,
- the switch module is configured to:
  - in a first time period, close the first switch and the second switch and open the third switch to output the first voltage to a first end of the capacitor module; and
  - in a second time period, close the third switch and open the first switch and the second switch to output the second voltage to a second end of the capacitor module to set a voltage of the first end of the capacitor module; and
- the transistor module is electrically connected with a first end of the capacitor module and the light emission module, and is configured to drive the light emission module to emit a light with the voltage of the first end of the capacitor module.

2. The device according to claim 1, wherein the voltage generation module comprises:

- a first voltage generation unit configured to generate the first voltage based on luminance information and predetermined luminance-voltage relation, wherein the predetermined luminance-voltage relation comprises an association relation between luminance information and voltage.

3. The device according to claim 2, wherein the voltage generation module further comprises:

- a second voltage generation unit configured to generate the second voltage based on a type of a transistor and a threshold voltage of a transistor in the transistor module.

4. The device according to claim 3, wherein to generate the second voltage based on the type of the transistor and the threshold voltage of the transistor in the transistor module comprises:

- based on a transistor in the transistor module being a NMOS transistor, generating a second voltage with a value larger than a threshold voltage of the NMOS transistor and that is positive; or
- based on a transistor in the transistor module being a PMOS transistor, generating a second voltage with a value larger than a threshold voltage of the PMOS transistor and that is negative.

5. The device according to claim 1, wherein the capacitor module comprises:

- a first capacitor, a first end of the first capacitor being electrically connected, as a first end of the capacitor module, to the switch module and the transistor module, a second end of the first capacitor being electrically connected, as a second end of the capacitor module, to the switch module.

6. The device according to claim 1, wherein the drive device comprises a plurality of transistor modules, a plurality of capacitor modules, and a plurality of light emission modules, the switch module comprises a plurality of first switches, the voltage generation module is capable of generating a plurality of first voltages, wherein the voltage generation module is further configured to output a plurality of first voltages, each one of the first voltages corresponding to each one of the transistor modules;

the switch module is further configured to set a voltage at a first end of each one of the capacitor modules to respective one of the first voltages and the second voltages so that the transistor module drives the light emission module.

7. The device according to claim 1, wherein the light emission module comprises any one or more of LCD, LED, MiniLED, MicroLED or OLED.

8. An electronic apparatus, wherein the electronic apparatus comprises a drive device comprising a voltage generation module, a switch module, a capacitor module, a transistor module, and a light emission module, wherein:

the voltage generation module is configured to generate a first voltage and a second voltage;

the switch module comprises:

a first switch comprising a first end configured to receive the first voltage and a second end electrically connected to a first end of the capacitor module;

a second switch comprising a first end connected to ground and a second end electrically connected to a second end of the capacitor module; and a third switch comprising a first end configured to receive the second voltage and a second end electrically connected to a second end of the capacitor module, the switch module is configured to;

in a first time period, close the first switch and the second switch and open the third switch to output the first voltage to a first end of the capacitor module; and in a second time period, close the third switch and open the first switch and the second switch to output the second voltage to a second end of the capacitor module to set a voltage of the first end of the capacitor module; and the transistor module is electrically connected with a first end of the capacitor module and the light emission module, and is configured to drive the light emission module to emit a light with the voltage of the first end of the capacitor module.

9. The electronic apparatus according to claim 8, wherein the voltage generation module comprises:

a first voltage generation unit configured to generate the first voltage based on luminance information and predetermined luminance-voltage relation, wherein the predetermined luminance-voltage relation comprises an association relation between luminance information and voltage.

10. The electronic apparatus according to claim 9, wherein the voltage generation module further comprises:

a second voltage generation unit configured to generate the second voltage based on a type of a transistor and a threshold voltage of a transistor in the transistor module.

11. The electronic apparatus according to claim 10, wherein to generate the second voltage based on the type of the transistor and the threshold voltage of the transistor in the transistor module comprises:

based on a transistor in the transistor module being a NMOS transistor, generating a second voltage with a value larger than a threshold voltage of the NMOS transistor and that is positive; or based on a transistor in the transistor module being a PMOS transistor, generating a second voltage with a value larger than a threshold voltage of the PMOS transistor and that is negative.

12. The electronic apparatus according to claim 8, wherein the capacitor module comprises:

a first capacitor, a first end of the first capacitor being electrically connected, as a first end of the capacitor module, to the switch module and the transistor module, a second end of the first capacitor being electrically connected, as a second end of the capacitor module, to the switch module.

13. The electronic apparatus according to claim 8, wherein the drive device comprises a plurality of transistor modules, a plurality of capacitor modules, and a plurality of light emission modules, the switch module comprises a plurality of first switches, the voltage generation module is capable of generating a plurality of first voltages, wherein the voltage generation module is further configured to output a plurality of first voltages, each one of the first voltages corresponding to each one of the transistor modules;

the switch module is further configured to set a voltage at a first end of each one of the capacitor modules to respective one of the first voltages and the second voltages so that the transistor module drives the light emission module.

14. The electronic apparatus according to claim 8, wherein the light emission module comprises any one or more of LCD, LED, MiniLED, MicroLED or OLED.

15. The electronic apparatus according to claim 8, the electronic apparatus comprises a display, a smart phone or a portable device.

* * * * *